(12) United States Patent
Bauer

(10) Patent No.: US 9,500,111 B2
(45) Date of Patent: Nov. 22, 2016

(54) METHOD FOR DETERMINING REDUCING AGENT SLIPPAGE AND MOTOR VEHICLE EMPLOYING THE METHOD

(71) Applicant: EMITEC GESELLSCHAFT FUER EMISSIONSTECHNOLOGIE MBH, Lohmar (DE)

(72) Inventor: Peter Bauer, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/589,067

(22) Filed: Jan. 5, 2015

(65) Prior Publication Data

US 2015/0113957 A1 Apr. 30, 2015

Related U.S. Application Data

(63) Continuation of application No. PCT/EP2013/062877, filed on Jun. 20, 2013.

(30) Foreign Application Priority Data

Jul. 4, 2012 (DE) .................. 10 2012 105 953

(51) Int. Cl.
 *F01N 3/20* (2006.01)
 *F01N 11/00* (2006.01)

(52) U.S. Cl.
 CPC ............. *F01N 3/208* (2013.01); *F01N 11/00* (2013.01); *F01N 2550/05* (2013.01); *F01N 2560/026* (2013.01); *F01N 2610/02* (2013.01); *F01N 2900/1402* (2013.01); *F01N 2900/1616* (2013.01); *Y02T 10/24* (2013.01)

(58) Field of Classification Search
 CPC ............. F01N 3/208; F01N 2560/026; F01N 2610/02; F01N 2900/1616; F01N 2900/1621
 See application file for complete search history.

(56) References Cited

U.S. PATENT DOCUMENTS

| 8,573,043 B2 | 11/2013 | Bastoreala et al. |
| 8,667,782 B2 | 3/2014 | Yasui |
| 8,813,477 B2 | 8/2014 | Yasui et al. |

(Continued)

FOREIGN PATENT DOCUMENTS

| DE | 102007009873 A1 | 9/2008 |
| DE | 102009027184 A1 | 12/2010 |
| DE | 102010029740 A1 | 12/2011 |

(Continued)

*Primary Examiner* — Jonathan Matthias
(74) *Attorney, Agent, or Firm* — Laurence A. Greenberg; Werner H. Stemer; Ralph E. Locher

(57) ABSTRACT

A method for determining reducing agent slippage from an exhaust-gas treatment device includes determining a difference between sensor signals of a second nitrogen oxide sensor and of a device for determining a nitrogen oxide compound quantity upstream of an SCR catalytic converter in an exhaust-gas flow direction; determining a controlling deviation from the difference and a target value of a controlling element; determining a gradient of an integral controlling component; and identifying reducing agent slippage if the controlling deviation exceeds a first threshold value and the gradient exceeds a second threshold value. The method and a corresponding device make it possible to reliably identify reducing agent slippage so that a very fast controlling element can be used.

7 Claims, 2 Drawing Sheets

(56) References Cited

U.S. PATENT DOCUMENTS

2012/0006004 A1* 1/2012 Tai .................. F01N 3/208
60/274
2013/0104530 A1* 5/2013 Geveci ............... G01N 27/407
60/301

FOREIGN PATENT DOCUMENTS

| EP | 2317091 A1 | 5/2011 |
| EP | 2357334 A1 | 8/2011 |

* cited by examiner

METHOD FOR DETERMINING REDUCING AGENT SLIPPAGE AND MOTOR VEHICLE EMPLOYING THE METHOD

CROSS-REFERENCE TO RELATED APPLICATION

This is a continuation, under 35 U.S.C. §120, of copending International Application No. PCT/EP2013/062877, filed Jun. 20, 2013, which designated the United States; this application also claims the priority, under 35 U.S.C. §119, of German Patent Application DE 10 2012 105 953.5, filed Jul. 4, 2012; the prior applications are herewith incorporated by reference in their entirety.

BACKGROUND OF THE INVENTION

Field of the Invention

The invention relates to a method for determining reducing agent slippage from an exhaust-gas treatment device, in particular for mobile internal combustion engines. The invention also relates to a motor vehicle employing the method.

In order to prevent the release of nitrogen oxide compounds resulting from the combustion in modern internal combustion engines, in particular in diesel engines, the so-called SCR (selective catalytic reduction) method has become established. For that purpose, an SCR catalytic converter is used which has a coating which enables the reaction to occur at relatively low temperatures. During the selective catalytic reduction, the nitrogen oxide compounds are caused to react with ammonia, in such a way that nitrogen and water are formed. In order to achieve as high a conversion rate as possible, it is desirable for the greatest possible amount of ammonia to be available for the reaction. It is, however, simultaneously necessary that as little ammonia as possible exits the SCR catalytic converter or the exhaust-gas treatment device, because ammonia is perceptible in the form of an unpleasant smell even in small quantities. The stoichiometric metering of ammonia thus represents the optimum metering quantity. However, a multiplicity of methods which are already known in order to approach that optimum, either exhibit slow adaptation or low efficiency with regard to the converted volume or ammonia consumed.

SUMMARY OF THE INVENTION

It is accordingly an object of the invention to provide a method for determining reducing agent slippage and a motor vehicle employing the method, which at least partially overcome the hereinafore-mentioned disadvantages and/or problems of the heretofore-known methods and vehicles of this general type.

With the foregoing and other objects in view there is provided, in accordance with the invention, a method for determining reducing agent slippage from an exhaust-gas treatment device which includes at least the following components:
an SCR catalytic converter;
a metering-in location for reducing agent, disposed upstream of the SCR catalytic converter in the exhaust-gas flow direction;
a device for determining a nitrogen oxide compound quantity upstream of the SCR catalytic converter in the exhaust-gas flow direction; and
a second nitrogen oxide sensor downstream of the SCR catalytic converter in the exhaust-gas flow direction.

Reducing agent and nitrogen oxide compounds are not distinguishable for the device and the second nitrogen oxide sensor. A quantity of reducing agent metered into the exhaust-gas treatment device is regulated by a controlling element which has an integral controlling component. In this case, the method comprises at least the following steps:
a) determining a difference between the sensor signals of the second nitrogen oxide sensor and of the device;
b) determining a controlling deviation from the difference and a target value of the controller;
c) determining a gradient of the integral controlling component; and
d) identifying reducing agent slippage if the controlling deviation exceeds a first threshold value and the gradient exceeds a second threshold value.

Reducing agent slippage, which is to be prevented, arises in particular in the event of superstoichiometric metering-in of ammonia or of a reducing agent or reducing agent precursor, in particular a urea-water solution such as, for example, AdBlue® with a urea content of 32.5%. In this case, the urea-water solution is converted into ammonia and water thermally in the exhaust gas (thermolysis) and/or hydrolytically in a hydrolysis catalytic converter. This superstoichiometric metering-in may arise firstly as a result of a deviation of the required quantity from the metered-in quantity and/or as a result of temperature variations at an SCR catalytic converter which exhibits ammonia storage capability, because the storage capability varies with temperature. Reducing agent slippage may also arise solely as a result of a temperature variation of the storage catalytic converter.

The SCR catalytic converter is, in particular, a (for example ceramic) honeycomb body through which the exhaust gas can flow and which has the largest possible surface area. A coating, which is provided on the surface of the SCR catalytic converter which comes into contact with the exhaust-gas flow, lowers the reaction temperature of the redox reaction between ammonia and nitrogen oxide compounds. Furthermore, a coating may be provided on the SCR catalytic converter which can store unconsumed ammonia and which thus provides the SCR catalytic converter with storage capability. Such a coating may also be provided in a structurally separate storage catalytic converter. In this application, the SCR catalytic converter and the storage catalytic converter are, even in the case of structural separation, designated jointly as an SCR catalytic converter. At this juncture, it is pointed out that the method functions both with the use of a catalytic converter with storage capability and without the use of a catalytic converter with storage capability.

Upstream of the SCR catalytic converter in the exhaust-gas flow direction, there is provided a metering-in location (valve, injector or the like) for a reducing agent, in such a way that the ammonia gas is made available for the SCR reaction in the SCR catalytic converter. It is often the case that a reducing agent precursor is injected into the exhaust gas, is fully evaporated for the first time in the exhaust gas, and is thus converted into ammonia for the first time therein.

Furthermore, the exhaust-gas treatment device has a second nitrogen oxide sensor downstream of the SCR catalytic converter in the exhaust-gas flow direction. In the case of the pulsating flow of the exhaust gas, the expression "exhaust-gas flow direction" refers to the direction which, in the exhaust-gas treatment device, points from the internal combustion engine toward the exhaust line outlet into the environment.

Furthermore, the exhaust-gas treatment device includes a device for determining a nitrogen oxide compound quantity upstream of the SCR catalytic converter in the exhaust-gas flow direction. The device may, for example, be a first nitrogen oxide sensor which is of substantially the same construction as the second nitrogen oxide sensor and which differs therefrom only in terms of its position relative to the SCR catalytic converter. The determining device may, however, also be an exhaust-gas model which is calculated on the basis of empirical test data or which, on the basis of "look-up" tables, provides respectively corresponding stored output values for stored input values.

For explanation, it is pointed out that the device for determining the nitrogen oxide compound quantity may include a first nitrogen oxide sensor upstream of the SCR catalytic converter in the exhaust-gas flow direction. The designations "first" and "second" nitrogen oxide sensor have been selected on the basis that, in the flow direction, the exhaust gas reaches the first nitrogen oxide sensor (upstream of the SCR catalytic converter) first and then reaches a second nitrogen oxide sensor (downstream of the SCR catalytic converter). If the device for determining the nitrogen oxide compound quantity does not have a nitrogen oxide sensor, the exhaust-gas treatment apparatus may also have only a single (in this case still referred to as "second") nitrogen oxide sensor.

At least for the second nitrogen oxide sensor, and also if the first nitrogen oxide sensor is used, reducing agent is not distinguishable from nitrogen oxide compounds. That is to say a nitrogen oxide sensor outputs the same measurement signal when it detects reducing agent (that is to say, in particular, ammonia gas) as when it detects nitrogen oxide compounds. If the first nitrogen oxide sensor is disposed upstream of the metering-in location for reducing agent, the measurement results are in principle identical to a model-based calculation of a nitrogen oxide compound quantity upstream of the SCR catalytic converter, because no reducing agent is yet present there.

The quantity of reducing agent metered in is regulated by using a controlling element which, in principle, aligns a conversion rate with the quantity of reducing agent to be metered in in the future. In the controlling element, there is provided an integral controlling component which performs the function of a memory: As a result of the integration of the controller input values, the controller output value is corrected by the average input values, and thus a dampening controller action is realized over the duration of controller operation, which does not permit excessive deviations in relation to the average of the input values. If a differential component is omitted in the controlling element, a rapid and precise controller is realized which, in particular, reaches the desired output value quickly and has a stable profile over the duration of operation.

In order to ensure that the capabilities of the controlling element can be fully utilized, the following method steps are proposed: Firstly, by using a first difference operator, a difference between the sensor signals or the output value of the model of the nitrogen oxide compound quantity upstream of the SCR catalytic converter and the nitrogen oxide compound quantity downstream of the SCR catalytic converter is calculated. Subsequently, the controlling deviation is calculated, by using a further difference operator, from the difference of a (stored and/or calculated) target value of the controller (for attaining the stoichiometric optimum). In this case, the target value of the controller may also lie below the stoichiometric optimum or above the stoichiometric optimum, wherein consideration should be given to whether a storage catalytic converter is provided, to the extent to which this is incorporated into the model, and/or to the extent of the conversion that can be attained by using the commonly used barrier catalytic converter (an oxidation catalytic converter disposed downstream of the SCR catalytic converter).

In a further step, which may be performed in parallel with steps a) and b), the gradient of the integral controlling component is determined. The gradient represents the rate of change over time of the integral controlling component. If the magnitude of the gradient is large, this must be assumed to signify large changes in the integral controlling component. By contrast, if the gradient is small, the controller is operating in a stable range or in a range close to the predefined target value. The predefined target value emerges, for example, from the relevant legal requirements. The requirements are geared toward the field of use and the untreated emissions (emissions without significant exhaust-gas treatment) of the engine. The legal requirements may also stipulate the predefined target value in percent. For example, the target value may be a reduction of the nitrogen oxides in the exhaust gas by 80 percent in relation to the untreated emissions. For example, within the scope of the implementation of the described method (depending on exhaust gas mass flow and quantity of the injected liquid additive), a decrease to 65 percent (and an increase of the injected quantity of liquid additive to 1.3 to 1.4 times) may be admissible for a time period of from 5 to 180 seconds.

If the determined controlling deviation now exceeds (and/or reaches) a first threshold value, and if also the gradient of the integral controlling component exceeds a second threshold value, it is inferred from this that reducing agent slippage (passage of ammonia gas through the SCR catalytic converter) is occurring. The dosing quantity is accordingly reduced by the controller. This assumption is based on the following relationships: At least the second nitrogen oxide sensor does not distinguish between reducing agent, which escapes from the SCR catalytic converter as a result of being present in superstoichiometric quantities, and nitrogen oxide compounds. If it is assumed that the reducing agent has been added substoichiometrically and is completely converted in each case, that is to say no slippage occurs, the second nitrogen oxide sensor detects exclusively nitrogen oxide compounds, specifically from the magnitude of the discrepancy with respect to the stoichiometric metering quantity. In such a situation, the controlling element will increase the metering quantity up to a target value of the controller, for example the stoichiometric optimum.

However, if more reducing agent is metered in than can be converted, the second nitrogen oxide sensor detects partly reducing agent and possibly partly nitrogen oxide compounds. Without the threshold values being observed, the quantity of reducing agent metered in would be raised further because the input signal suggests an excess of nitrogen oxide compounds. Since it is, however, now the case that, in the event of slippage occurring, the quantity of reducing agent can cause the measurement deviation by the second nitrogen oxide sensor to suddenly increase significantly after a slow approach to the target value, the misinterpretation of the controller is detected by using a combination of the threshold values, and the quantity of reducing agent metered in can be reduced correspondingly by the controlling element. The speed of a controller of this type which is based on the proposed method is very high, and the algorithm is surprisingly simple. In this way, a reliable method is realized in which reducing agent slippage that occurs is reliably detected and can thus be reliably prevented.

In accordance with another advantageous mode of the invention, a storage catalytic converter for storing reducing agent is disposed upstream of the second nitrogen oxide sensor and downstream of the metering-in location as viewed in the exhaust-gas flow direction. In this case, it is very particularly preferable for the SCR catalytic converter to be in the form of a storage catalytic converter, that is to say to itself (intermittently) store reducing agent. This may be achieved by using a porous base material (for example ceramic) and/or a specially adapted coating (porosity, quantity, layer thickness, etc.).

A storage catalytic converter is capable of storing ammonia that has been added superstoichiometrically, and of releasing the ammonia again if required (later or in the presence of different ambient conditions). Storage catalytic converters often exhibit a significantly temperature-dependent storage capability. When the storage catalytic converter is cold, it can store only a small quantity of ammonia. The storage capability likewise decreases if the storage catalytic converter is too hot. When the storage catalytic converter is operating in a stable temperature range, it can thus be adequately ensured that a stoichiometric quantity of ammonia is available for the SCR reaction. In particular, in the case of mobile internal combustion engines, however, the temperatures fluctuate very intensely. This impairs the utilization of the storage catalytic converter. One possibility for dealing with this labile characteristic of the storage catalytic converter is for the storage catalytic converter to be filled only to such an extent that it does not reach its maximum storage in most temperature ranges, and thus also no temperature-induced slippage occurs. Such regulation is, however, inefficient because it does not approximately completely exploit the buffer capabilities of the storage catalytic converter.

With the method described above, it is possible to react very rapidly to such temperature changes and/or erroneous dosings, in such a way that the buffer characteristics of a storage catalytic converter can be utilized with considerably higher efficiency. The detection of the temperature of the storage catalytic converter is, for most situations, not adequately rapid due to the components which are provided which have heat capacity. The proposed method remedies this and furthermore offers direct measurement of the reducing agent slippage, in such a way that malfunctions and aging of the storage catalytic converter are also adequately regulated.

In accordance with a further advantageous mode of the invention, the method is activated when the internal combustion engine connected to the exhaust-gas treatment device is in a constant operating state.

In particular, in the case of an exhaust-gas treatment device without a storage catalytic converter or with an SCR catalytic converter with only a low storage effect, it is expedient for the method to be activated only in a constant operating state (detectable or predictable operating phase with only little change in ambient conditions in the exhaust-gas after treatment device) of the internal combustion engine.

The distinction as to whether or not a "constant" operating state is present may be made on the basis of threshold values for certain operating parameters of the motor vehicle. For example, a gradient of the engine rotational speed and/or a gradient of the engine load may be utilized for the distinction. A gradient takes into consideration the change with respect to time of the operating parameter. If the gradient or gradients fall(s) below a predefined threshold value, then a "constant" operating state is present. A gradient of the nitrogen oxide mass flow may also be used as a parameter for identifying the "constant" operating state. A "constant" operating state is present only when the gradient lies below a set threshold value.

Conventional methods are then used for the other states, in which changes in load of the internal combustion engine and thus variations in temperatures and exhaust-gas compositions occur. It is specifically in a constant operating state that the optimum stoichiometric state of the metering quantity is reached rapidly by using the proposed method. The occurrence of reducing agent slippage due to superstoichiometric metering of reducing agent is detected in an effective manner even in the case of small quantities. An excessive overshooting of an upper limit of reducing agent slippage is thus achieved. In particular, the proposed method is suitable for compensating a reduction in conversion rate in the SCR catalytic converter due to aging, poisoning or other changes that occur to the SCR catalytic converter over time.

In accordance with an added advantageous mode of the invention, the integral controlling component is, for a first time interval, limited to a maximum value if reducing agent slippage has been identified in step d).

As a result of the setting of the integral controlling component to a maximum value, the "memory function" of the integral controlling component is converted into a target value generator with a proportional controlling element. The maximum value may in this case be set, on the basis of empirical data, to a fixed value at which reducing agent slippage is prevented under normal conditions. Likewise, the maximum value may be adapted in a manner dependent on the input variables, specifically for example the extent of the deviation from the first threshold value and/or from the second threshold value, for example on the basis of a "look-up" table. In general, the integral controlling component is reduced to a maximum value which lies below the integrated controlling component. Thus, following step d), it is in particular the case that a maximum value is either (newly) introduced and/or an already existing limit value is reduced to a predefinable maximum value. In setting the maximum value for the integral controlling component, the relaxation time required by the controller after the described method is carried out, and the maximum admissible time for which correct reduction of the nitrogen oxide emissions does not occur, should be taken into consideration. The times are dependent on the respective exhaust-gas regulations. Correct reduction typically does not take place during the relaxation time. The lower the maximum value is, the more easily the described method is initiated.

With the objects of the invention in view, there is concomitantly provided a motor vehicle, comprising an internal combustion engine and an exhaust-gas treatment device for purification of the exhaust gases of the internal combustion engine. The exhaust-gas treatment device has at least the following components:
- an SCR catalytic converter;
- a metering-in location for reducing agent, disposed upstream of the SCR catalytic converter in the exhaust-gas flow direction;
- a device for determining a nitrogen oxide compound quantity upstream of the SCR catalytic converter in the exhaust-gas flow direction; and a second nitrogen oxide sensor downstream of the SCR catalytic converter in the exhaust-gas flow direction; and a control unit or controller which is set up for carrying out a method according to the above description.

The exhaust-gas treatment device is constructed for eliminating pollutants from the exhaust gas, in such a way that a very high percentage of what is released to the environment at the outlet of an exhaust line is exclusively carbon dioxide, nitrogen and water. In particular, in the exhaust-gas treatment device, it is preferably the case that the combustion products of a diesel fuel are converted, in the presence of low temperatures, into non-harmful exhaust gases. An SCR catalytic converter which has storage characteristics or which is constructed exclusively for initiating the reaction, for example by lowering the reaction temperature, is used for the reduction of the nitrogen oxide compounds in the exhaust gas.

Upstream of the SCR catalytic converter as viewed in the exhaust-gas flow direction, there is disposed a metering-in location for reducing agent, for example an injector, such as is known for the injection of fuel into the combustion chamber of an internal combustion engine. Through the use of this metering-in location, a reducing agent or a reducing agent precursor is introduced, so that the reducing agent precursor is converted into ammonia, for example, with the aid of the exhaust-gas temperature and chemical composition of the exhaust gas.

Furthermore, a device is provided for determining a nitrogen oxide compound quantity upstream of the SCR catalytic converter in the exhaust-gas flow direction. The device may be either a nitrogen oxide sensor or a nitrogen oxide model, for example based on the oxidation catalytic converter that is commonly positioned upstream. Furthermore, downstream of the SCR catalytic converter as viewed in the exhaust-gas flow direction, there is provided a second nitrogen oxide sensor which can determine the nitrogen oxide quantity in the exhaust gas downstream of the SCR reaction having taken place. The metering of reducing agent is controlled by using a control unit which can carry out the method described herein. The control unit or controller may in this case be constructed and/or set up in such a way that, in addition to this method, a conventional method can be carried out alternatively or in parallel.

Other features which are considered as characteristic for the invention are set forth in the appended claims, noting that the features specified individually in the claims may be combined with one another in any desired technologically meaningful way and may be supplemented by explanatory facts from the description and details from the figures, with further embodiments of the invention being specified.

Although the invention is illustrated and described herein as embodied in a method for determining reducing agent slippage and a motor vehicle employing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
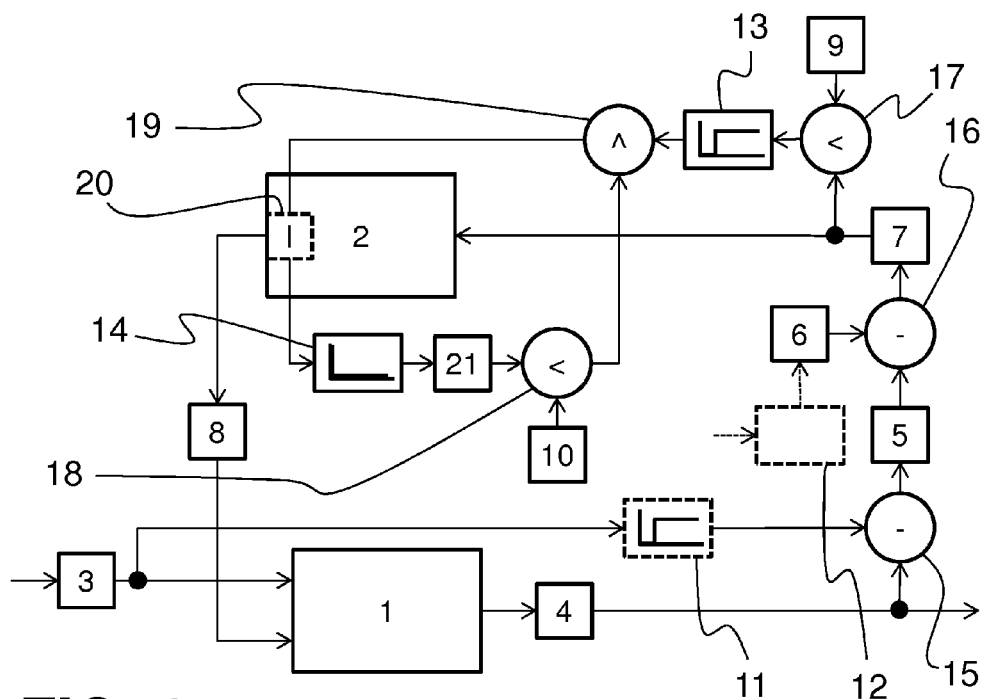
FIG. 1 is a schematic and block diagram illustrating an embodiment of a method for determining reducing agent slippage from an exhaust-gas treatment device.

Referring now in detail to the figures of the drawing which show particularly preferred structural variants to which the invention is not restricted and in which proportions are diagrammatic, and first, particularly, to FIG. 1 thereof, there is seen a schematic and block diagram illustrating an exemplary embodiment of a method for determining reducing agent slippage from an exhaust-gas treatment device. A model 1 of an SCR catalytic converter 25 (illustrated in FIG. 3) determines a conversion rate. The model 1 receives a first sensor signal 3 and a dosing signal 8 as input variables. The first sensor signal 3 can be obtained by a device and/or a first nitrogen oxide sensor and represents a determined nitrogen oxide compound quantity in inflowing exhaust gas upstream of the SCR catalytic converter 25. The dosing signal 8 represents a quantity of reducing agent metered in through a metering location or spot 26 (illustrated in FIG. 3) upstream of the SCR catalytic converter 25. In the case of the nitrogen oxide quantity being detected by using a first nitrogen oxide sensor 28 (illustrated in FIG. 3) downstream of the metering of reducing agent, an erroneous measurement can be corrected with the aid of the dosing signal 8 to correct the first sensor signal 3.

In the SCR catalytic converter 25 (and/or likewise in the model 1 of the SCR catalytic converter 25), the nitrogen oxide compounds and the ammonia are converted in a redox reaction. The result is detected by using a second sensor signal 4 downstream of the SCR catalytic converter 25, in which case the second sensor signal 4 does not distinguish between nitrogen oxide compounds and reducing agent. Subsequently, a difference 5 is formed by a first difference operator 15 from the second sensor signal 4 and the first sensor signal 3 as input signals. In this case, the first sensor signal 3 may possibly be conducted through a first delay time element 11 in such a way that the sensor signals relate to the same exhaust-gas section dealt with in the model 1 of the SCR catalytic converter 25. In this case, the delay time element 11 may be set on the basis of (predetermined) empirical test data regarding the spatial velocity of the exhaust gas in the SCR catalytic converter 25 or adapted to the respectively prevailing spatial velocity on the basis of models and/or measurements. Subsequently, by using a second difference operator 16, a controlling deviation 7 is formed from the difference 5 and a target value 6 as input values. The target value 6 in this case is the desired reducing agent metering quantity, for example the (presently) stoichiometric metering quantity. In this case, the target value 6 may be a fixed value or may be adapted to the conversion in the SCR catalytic converter 25 by using a further model, as is indicated therein by a dashed function block 12 and arrows. Subsequently, the controlling deviation 7 is fed to a controlling element 2, which has an integral controlling component 20 and which determines the reducing agent metering quantity by using the dosing signal 8. At the same time, the controlling deviation 7 is tapped off and compared by using a first comparative operator 17, with a first threshold value 9.

The integral controlling component 20 is converted by using a differential element 14 into a gradient 21. The gradient 21 is compared with a second threshold value 10 by a second comparative operator 18. It is only when both threshold values are exceeded that they have an influence, through a base operator 19, on the integral controlling component 20.

In order to ensure that the comparison results of the same regulation sequence are compared with one another, a second delay time element 13 is interposed between the base operator 19 and the comparative operator 17.

Figure 2:
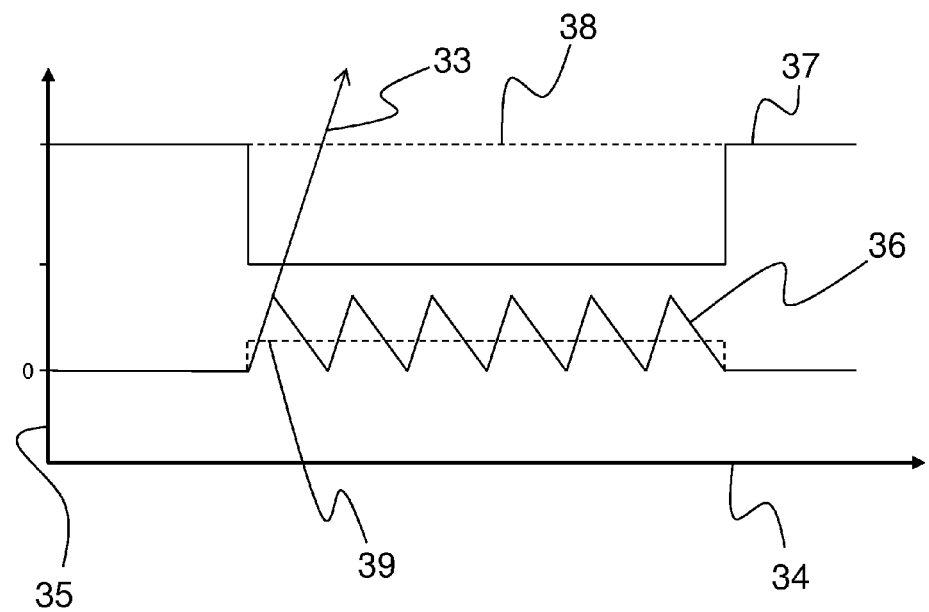
FIG. 2 is a diagram showing regulation.

FIG. 2 is a regulation diagram illustrating the reaction of a controller 27, in the form of a reducing agent slippage 36, to a disrupted or undesired conversion rate 37. In this case, the abscissa 34 is the time axis. The ordinate 35 defines values, which are not shown to scale, of the reducing agent slippage 36 and of the conversion rate 37. As long as the conversion rate coincides with a target conversion rate 38, the slippage is zero, as can be read off the ordinate 35. In the event of a disruption, the conversion rate 37 falls, and a PI controller curve 33 would rise because it does not identify that the conversion rate 37 has fallen. Instead, it will assume that increased conversion is possible, and will seek to add more reducing agent. However, the controller 27 which carries out the method proposed herein reacts to the falling conversion rate 37 and sets the slippage 36 which, on average 39, deviates only slightly from zero.

Figure 3:
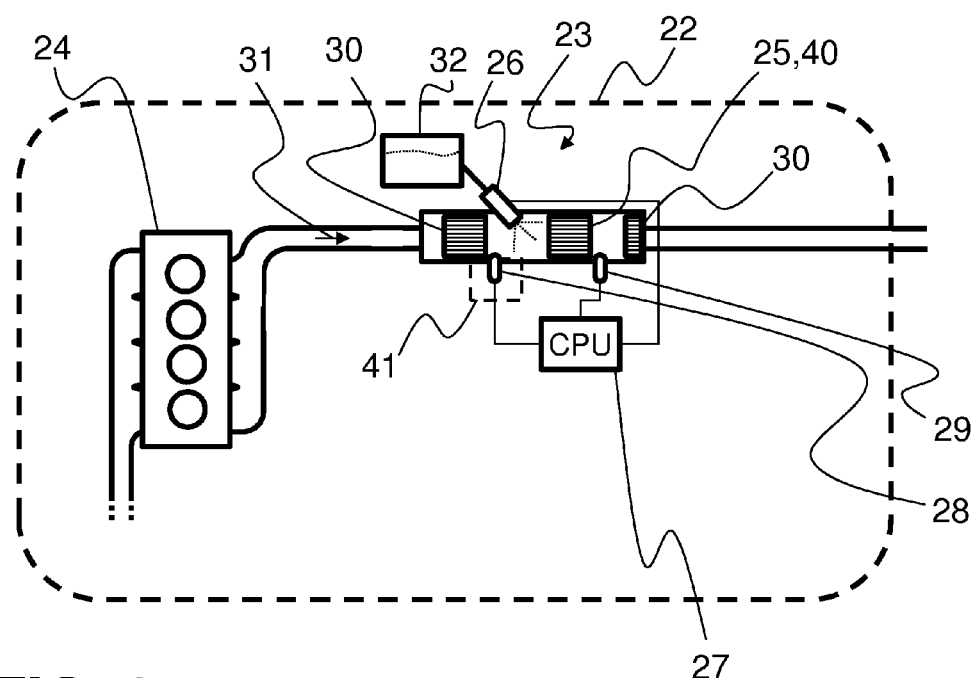
FIG. 3 is a plan view of a motor vehicle with an exhaust-gas treatment device.

FIG. 3 shows a motor vehicle 22 which has an exhaust-gas treatment device 23 and an internal combustion engine 24. The SCR catalytic converter 25 and the metering location 26 for reducing agent, which in this case is illustrated by way of example as an injection nozzle, are provided in the exhaust-gas treatment device 23. In this example, the controller 27 transmits the dosing signal 8 (see FIG. 1) to the metering location 26 on the basis of the input values from the first nitrogen oxide sensor 28 and a second nitrogen oxide sensor 29. The metering location 26 thereupon introduces reducing agent from a reducing agent tank 32 into the exhaust-gas treatment device 23 upstream of the SCR catalytic converter 25 as viewed in an exhaust-gas flow direction 31. In the illustrated example, the SCR catalytic converter 25 is provided in the form of a storage catalytic converter 40 (constructed in one piece therewith and/or integrated therein). The storage catalytic converter may, however, also be provided as a (separate) component and disposed directly upstream of the inlet side of the SCR catalytic converter 25 (as a sub-region of the honeycomb body and/or as a separate storage body (nonwoven, honeycomb body, etc.)) between the metering location 26 and the SCR catalytic converter 25. In this example, an oxidation catalytic converter 30 is likewise provided upstream of the metering location 26 and the first nitrogen oxide sensor 28, which in this case is a constituent part of a device 41 for determining the nitrogen dioxide compound quantity. A further oxidation catalytic converter 30 is provided downstream of the second nitrogen oxide sensor 29.

With the method proposed herein, it is possible for reducing agent slippage to be reliably detected even when using a nitrogen oxide sensor with cross-sensitivity to reducing agent, so that a very fast controlling element can be used.

The invention claimed is:

1. A method for determining reducing agent slippage from an exhaust-gas treatment device, the method comprising the following steps:
providing the exhaust-gas treatment device with:
an SCR catalytic converter;
a reducing agent metering-in location disposed upstream of the SCR catalytic converter in an exhaust-gas flow direction;
a device configured to determine a nitrogen oxide compound quantity upstream of the SCR catalytic converter in the exhaust-gas flow direction and configured to emit a sensor signal; and
a second nitrogen oxide sensor disposed downstream of the SCR catalytic converter in the exhaust-gas flow direction and emitting a sensor signal;
the device for determining a nitrogen oxide compound quantity and the second nitrogen oxide sensor not distinguishing between reducing agent and nitrogen oxide compounds;
regulating a quantity of reducing agent metered into the exhaust-gas treatment device by using a controlling element having an integral controlling component and a target value; and
with a controller:
a) determining a difference between the sensor signals of the second nitrogen oxide sensor and the device for determining a nitrogen oxide compound quantity;
b) determining a controlling deviation from the difference and the target value of the controlling element;
c) determining a gradient of the integral controlling component; and
d) identifying reducing agent slippage if the controlling deviation exceeds a first threshold value and the gradient exceeds a second threshold value.

2. The method according to claim 1, which further comprises providing a storage catalytic converter for storing reducing agent upstream of the second nitrogen oxide sensor and downstream of the metering-in location in the exhaust-gas flow direction.

3. The method according to claim 1, which further comprises activating the method when an internal combustion engine connected to the exhaust-gas treatment device is in a constant operating state.

4. The method according to claim 1, which further comprises limiting the integral controlling component to a maximum value for a first time interval if reducing agent slippage has been identified in step d).

5. The method according to claim 1, wherein the controller forms the controlling deviation by obtaining a difference between the target value and the difference between the sensor signals.

6. A motor vehicle, comprising:
an internal combustion engine emitting exhaust gases in an exhaust-gas flow direction;
an exhaust-gas treatment device for purification of the exhaust gases of said internal combustion engine, said exhaust-gas treatment device having:
an SCR catalytic converter;
a reducing agent metering-in location disposed upstream of said SCR catalytic converter in said exhaust-gas flow direction;
a device for determining a nitrogen oxide compound quantity upstream of said SCR catalytic converter in said exhaust-gas flow direction, said device emitting sensor signals and not distinguishing between reducing agent and nitrogen oxide compounds; and
a second nitrogen oxide sensor disposed downstream of said SCR catalytic converter in said exhaust-gas flow direction, said second nitrogen oxide sensor emitting sensor signals and not distinguishing between reducing agent and nitrogen oxide compounds;

a controlling element having an integral controlling component and a target value, said controlling element regulating a quantity of reducing agent metered into said exhaust-gas treatment device; and a controller configured for:

a) determining a difference between said sensor signals of said second nitrogen oxide sensor and said device for determining a nitrogen oxide compound quantity;

b) determining a controlling deviation from said difference and said target value of said controlling element;

c) determining a gradient of said integral controlling component; and d) identifying reducing agent slippage if said controlling deviation exceeds a first threshold value and said gradient exceeds a second threshold value.

7. The motor vehicle according to claim 6, wherein said controller is configured to form the controlling deviation by obtaining a difference between said target value and said difference between said sensor signals.

* * * * *